Figure 1:
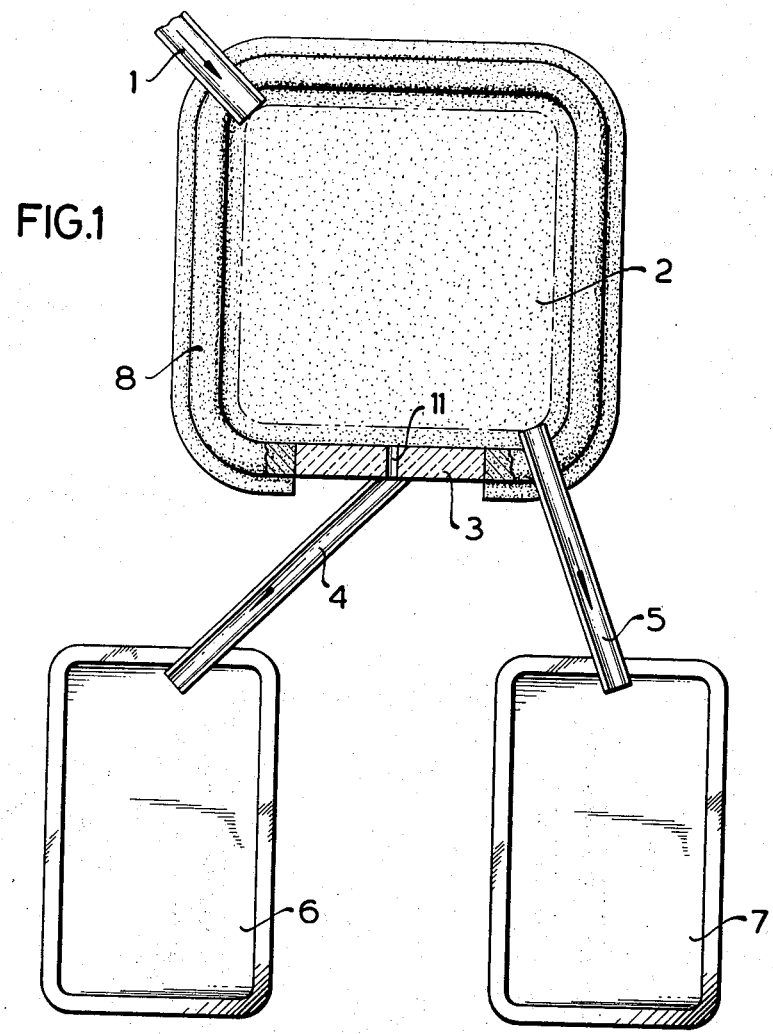

United States Patent [19]
Thümmler et al.

[11] 3,802,561
[45] Apr. 9, 1974

[54] PROCESS AND APPARATUS FOR SEPARATING PHOSPHORUS FURNACE SLAG AND FERROPHOSPHORUS FROM ONE ANOTHER

[75] Inventors: Ursus Thümmler; Josef Rothkamp, both of Erfstadt-Libar, Germany

[73] Assignee: Knapsack Aktiengesellschaft, Knapsack bei Cologne, Germany

[22] Filed: May 31, 1972

[21] Appl. No.: 258,261

[30] Foreign Application Priority Data
June 2, 1971   Germany............................ 2127251

[52] U.S. Cl.................................... 210/71, 210/83
[51] Int. Cl......................................... B01d 21/00
[58] Field of Search............ 210/69, 71, 73, 167, 83

[56] References Cited
UNITED STATES PATENTS
1,604,427  10/1926  Spicer............................. 210/69 X
2,375,232  5/1945  McNitt............................ 210/69 X
3,537,987  11/1970  Copeland........................ 210/69 X

*Primary Examiner*—John Adee
*Attorney, Agent, or Firm*—Connolly and Hutz

[57] ABSTRACT

Phosphorus furnace slag and ferrophosphorus are separated from one another. To this end, a mixture of phosphorus furnace slag and ferrophosphorus, which is tapped off periodically from a phosphorus furnace, is introduced into a separating zone fitted with a bottom outlet and an overflow, through which the phosphorus furnace slag floating on the ferrophosphorus is delivered to a solidification zone. The separating zone has the dimensions necessary to receive the quantity of ferrophosphorus tapped off, which is allowed to remain therein for a period between 0.25 and 2 hours, so as to complete the separation of the phosphorus furnace slag by allowing it to solidify above the liquid ferrophosphorus. Liquid ferrophosphorus is finally discharged through the bottom outlet in the separating zone and delivered to a solidification zone.

2 Claims, 2 Drawing Figures

PROCESS AND APPARATUS FOR SEPARATING PHOSPHORUS FURNACE SLAG AND FERROPHOSPHORUS FROM ONE ANOTHER

The present invention relates to a process for separating phosphorous furnace slag and ferrophosphorus from one another, and to an apparatus for carrying out this process.

U.S. Pat. No. 3,720,506 describes a process for separating ferrophosphorous and phosphorous furnace slag from one another, wherein a mixture of ferrophosphorous and photphorous furnace slag, tapped off periodically from a phosphorous furnace, is delivered to a casting bed, the heavier ferrophosphorous being deposited on the bottom of said bed separately from the phosphorous furnace slag which floats thereon. The mixture is allowed to cool and the phosphorous furnace slag is cracked, crushed and removed from the ferrophosphorous by means of suitable machinery. Following this, suitable machinery is used to crush and remove the ferrophosphorous from below the deposit thereof. A preferred feature of this earlier process comprises accelerating the cooling operation by spraying water on to the melt and on to the ferrophosphorous freed from the slag which initially floated thereon.

Two substances of poor thermal conductivity are jointly cooled in this earlier process, which is not satisfactory. To effect the cooling step within acceptable periods of time, it is necessary for the mixture of ferrophosphorus and phosphorus furnace slag to be sprayed with water, of which unevaporated fractions may come into contact with the lowermost liquid layer of ferrophosphorous, this being rendered possible by Leidenfrost's phenomenon. The reaction of molten ferrophosphorous with water is known to entail the evolution of oxyhydrogen gas, which in turn may initiate more or less dangerous explosions with all their consequences.

A further disadvantage resides in the fact that the thick layers of phosphorus furnace slag and ferrophosphorus, which often adhere tenaciously together, are not easy to separate from one another. Considerable expenditure of time and energy is normally necessary to achieve this.

It is an object of the present invention to provide a process, which enables ferrophosphorus and phosphorus furnace slag to be separated from one another by causing the ferrophosphorus and phosphorus furnace slag to solidify within acceptable periods of time, and this without the need to spray water thereonto nor with the need mechanically to separate the two layers of phosphorus furnace slag and ferrophosphorus, which tenaciously adhere together, from one another.

The process of the present invention comprises more particularly introducing a mixture of phosphorus furnace slag and ferrophosphorus, tapped off periodically from a phosphorus furnace, into a separating zone which is fitted with a closable bottom outlet and with an overflow, and has the dimensions necessary to receive the quantity of ferrophosphorus tapped off; delivering a major proportion of the phosphorus furnace slag, floating on the ferrophosphorus, through said overflow to a solidification zone downstream of the separating zone; allowing the ferrophosphorus to remain in said separating zone for a period between 0.25 and 2 hours, preferably 0.5 hour, so as to complete the separation of residual phosphorus furnace slag from the liquid ferrophosphorus with the resultant formation of a solid layer of phosphorus furnace slag above the ferrophosphorus; removing the liquid ferrophosphorus through the said bottom outlet in the said separating zone and delivering it to a separate ferrophosphorus solidification zone.

The step of allowing the ferrophosphorus and phosphorus furnace slag to solidify in separate zones has very beneficial effects. This is particularly true concerning the ferrophosphorus. In the absence of any insulating layer of phosphorus furnace slag above the ferrophosphorus, the heat is freely abstracted and the ferrophosphorus is cooled within acceptable limits without the need to use additional steps.

Molten ferrophosphorus and phosphorus furnace slag are known to form two layers in a phosphorus furnace. Turbulence is, however, produced upon the removal of the ferrophosphorus through a relatively small tapping hole in the furnace. As a result of this, phosphorus furnace slag and ferrophosphorus are discharged jointly. Owing to the considerable differences between the density of the two layers of molten material (flow rate of phosphorus furnace slag: $\rho = 2.7$ g/ml; liquid ferrophosphorus: $\rho \approx 7$ g/l), the phosphorus furnace slag is found relatively rapidly to deposit and float on the ferrophosphorus. This, however, enables the phosphorus furnace slag to be separated from the ferrophosphorus in the separating zone by means of an overflow.

Minor amounts of ferrophosphorus, which may be introduced into the solidification zone receiving the phosphorus furnace slag, or minor amounts of phosphorus furnace flag, which may be introduced into the solidification zone receiving the ferrophosphorus, may be ignored.

The presence of phosphorus furnace slag in the ferrophosphorus which is discharged through the bottom outlet of the separating zone, is easy to discover by a distinct color change in the last portions of the effluent melt.

It is a further object of the present invention to provide an apparatus for carrying out the process described hereinabove.

The apparatus comprises more particularly a separating bed for effecting separation therein of ferrophosphorus and phosphorus furnace slag from one another, the bed being fitted at one of its sides with a bunghole closable by means of a refractory plate and being connected to a phosphorus furnace by means of a pouring spout; a solidification bed receiving the phosphorus furnace slag and connected to the separating bed by means of an overflow, and a further solidification bed reveiving the ferrophosphorus and connected to the separating bed by means of an outlet spout extending from directly downstream of the bunghole in the separating bed and terminating in said further solidification bed.

Further preferred features of the apparatus of the present invention, which can be used singly or in combination, provide:

a. for the use of a sand bed as the separating bed and b. for the use of beds prepared from granulated phosphorus furnace slag as the solidification beds receiving the phosphorus furnace slag and the ferrophosphorus, respectively.

Figure 2:
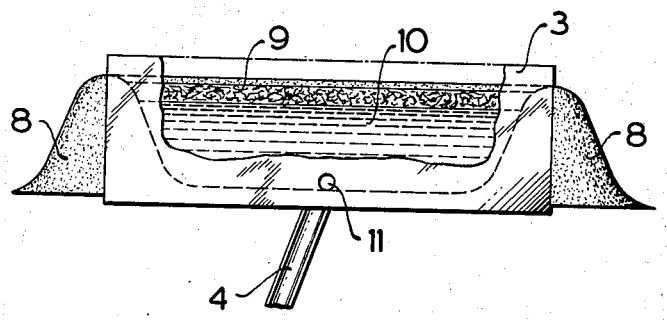

The apparatus of the present invention will now be described with reference to the accompanying drawing, in which FIG. 1 is a top plan view of the apparatus and FIG. 2 is a side elevational view of the separating bed in the direction of the refractory plate.

As can be seen, a mixture of phosphorus furnace slag and ferrophosphorus tapped off from a phosphorus furnace is deliverd through pouring spout 1 to separating bed 2, which has the dimensions necessary to collect therein the quantity of ferrophosphorus tapped off and to prevent ferrophosphorus from flowing through overflow 5 into solidification bed 7 receiving the phosphorus furnace slag. The slag, i.e., a major proportion thereof, which initially floats on the ferrophosphorus, is delivered through overflow 5 to bed 7 and allowed to solidify therein. The ferrophosphorus in the separating bed is allowed to remain therein for a certain period of time. Following this, bunghole 11 (cf. FIG. 2) in the refractory plate 3 of separating bed 2 is opened and liquid phosphorus is delivered through spout 4 to bed 6 and allowed to solidify therein.

Following the complete separation of the ferrophosphorus and phosphorus furnace slag from one another, two separate layers of material are found to build up behind the refractory plate 3 which together with sand weirs 8 forms separating bed 2. This is shown by the broken lines in FIG. 2. The two layers comprise a lower layer 10 of liquid ferrophosphorus and upper layer 9 of solidified phosphorus furnace slag. Layer 9 briding separating bed 2 is normally retained therein upon the removal of the liquid ferrophosphorus through bunghole 11.

EXAMPLE:

Suitable material (molding sand, clay, Söderberg electrode mass) was used to close bunghole 11 in refractory plate 3 of separating bed 2. Following this, a mixture (14 tons) of molten ferrophosphorus and phosphorus furnace slag, which had a temperature between 1,400° and 1,450°C, was delivered through pouring spout 1 to separating bed 2.6 Tons of specifically lighter phosphorus furnace slag were found to run through overflow 5 into solidification bed 7, and were allowed to solidify therein. The balance melt (8 tons), which consisted substantially of ferrophosphorus, was retained in separating bed 2 and allowed to remain therein for 30 minutes to enable the complete deposition of residual phosphorus furnace slag on the liquid ferrophosphorus. During that time, a substantial portion of the slag was found to solidify while forming a layer about 10–15 cm thick above the surface of the melt. Bunghole 11 was opened and liquid ferrophosphorus with a temperature of about 1,300°C was discharged through spout 4 into solidification bed 6. Towards the end of the discharge, the last portions of the melt suddenly underwent a change in coloration which indicated that the melt was contaminated with phosphorus furnace slag. This was slag, which had remained liquid between the layer of solidified slag and the layer of liquid ferrophosphorus. As soon as this was noticed, bunghole 11 was closed by means of sand. The ferrophosphorus and phosphorus furnace slag were allowed to cool in their beds for 3 hours. Bed 6 contained 7.3 tons of ferrophosphorus and bed 7 contained 6 tons of phosphorus furnace slag. A further 0.7 ton of phosphorus furnace slag was found to have been retained in separating bed 2. The solidified materials were easy to crush and remove from their beds by means of a digger.

We claim:

1. A process for separating a mixture of phosphorus furnace slag and ferrophosphorus into its components, the said mixture being tapped off discontinuously from a phosphorus furnace, comprising introducing the mixture into a separating zone which is fitted with a closable bottom outlet and with an overflow, and has the dimensions necessary to receive the quantity of ferrophosphorus obtained during one tapping step; the phosphorus furnace slag, which floats on the ferrophosphorus, travelling through said overflow to a solidification zone downstream of the separating zone; allowing the ferrophosphorus to remain in said separating zone for a period between 0.25 and 2 hours so as to complete the separation of the phosphorus furnace slag from, and its solidification above, the liquid ferrophosphorus; and discharging the liquid ferrophosphorus through the said bottom outlet in the said separating zone and conveying it to a separate ferrophosphorus solidification zone.

2. The process as claimed in claim 1, wherein the ferrophosphorus is allowed to remain in the separating zone for 30 minutes.

* * * * *